United States Patent [19]

Kawabata et al.

[11] Patent Number: 4,665,948

[45] Date of Patent: May 19, 1987

[54] ELECTROMAGNETICALLY OPERABLE FLUID FLOW CONTROL VALVE MECHANISM

[75] Inventors: Yasuhiro Kawabata, Anjyo; Shoji Ito, Nagoya; Yukio Kawai, Toyota; Mitsunori Sasano, Toyota; Fusaji Ohmura, Toyota, all of Japan

[73] Assignees: Aisin Seiki Kabushiki Kaisha; Toyota Jidosha Kabushiki Kaisha, both of Japan

[21] Appl. No.: 809,860

[22] Filed: Dec. 18, 1985

Related U.S. Application Data

[63] Continuation of Ser. No. 535,065, Sep. 23, 1983, abandoned.

[30] Foreign Application Priority Data

Sep. 29, 1982 [JP] Japan .......................... 57-146286[U]

[51] Int. Cl.[4] ....................... F16K 31/08; F16K 11/07
[52] U.S. Cl. ................................. 137/625.48; 251/65
[58] Field of Search .................... 251/DIG. 6, 129.21, 251/65; 137/625.48, 625.65

[56] References Cited

U.S. PATENT DOCUMENTS

| 4,307,752 | 12/1981 | Inada et al. ....................... 251/139 X |
| 4,350,319 | 9/1982 | Kawata et al. .................. 251/139 X |
| 4,368,759 | 1/1983 | Akagi . | |
| 4,437,645 | 3/1984 | Nomura et al. .................. 251/139 X |

Primary Examiner—Arnold Rosenthal
Attorney, Agent, or Firm—Finnegan, Henderson, Farabow, Garrett & Dunner

[57] ABSTRACT

An electromagnetic fluid flow control valve mechanism has a hollow slide valve linearly movable on and along a core in response to energization of a coil disposed around the slide valve for selective fluid communication between a inlet port and first and second outlet ports through a chamber in a casing. The ratio of a cross-sectional area of the inlet port to that of each of the first and second outlet ports is selected such that the chamber will develop a relatively small vacuum such as of 20 mmAg at maximum. Preferably, the ratio is 6.5 or greater. This arrangement prevents a fluid, typically air, from flowing from the second outlet port back into the chamber.

1 Claim, 1 Drawing Figure

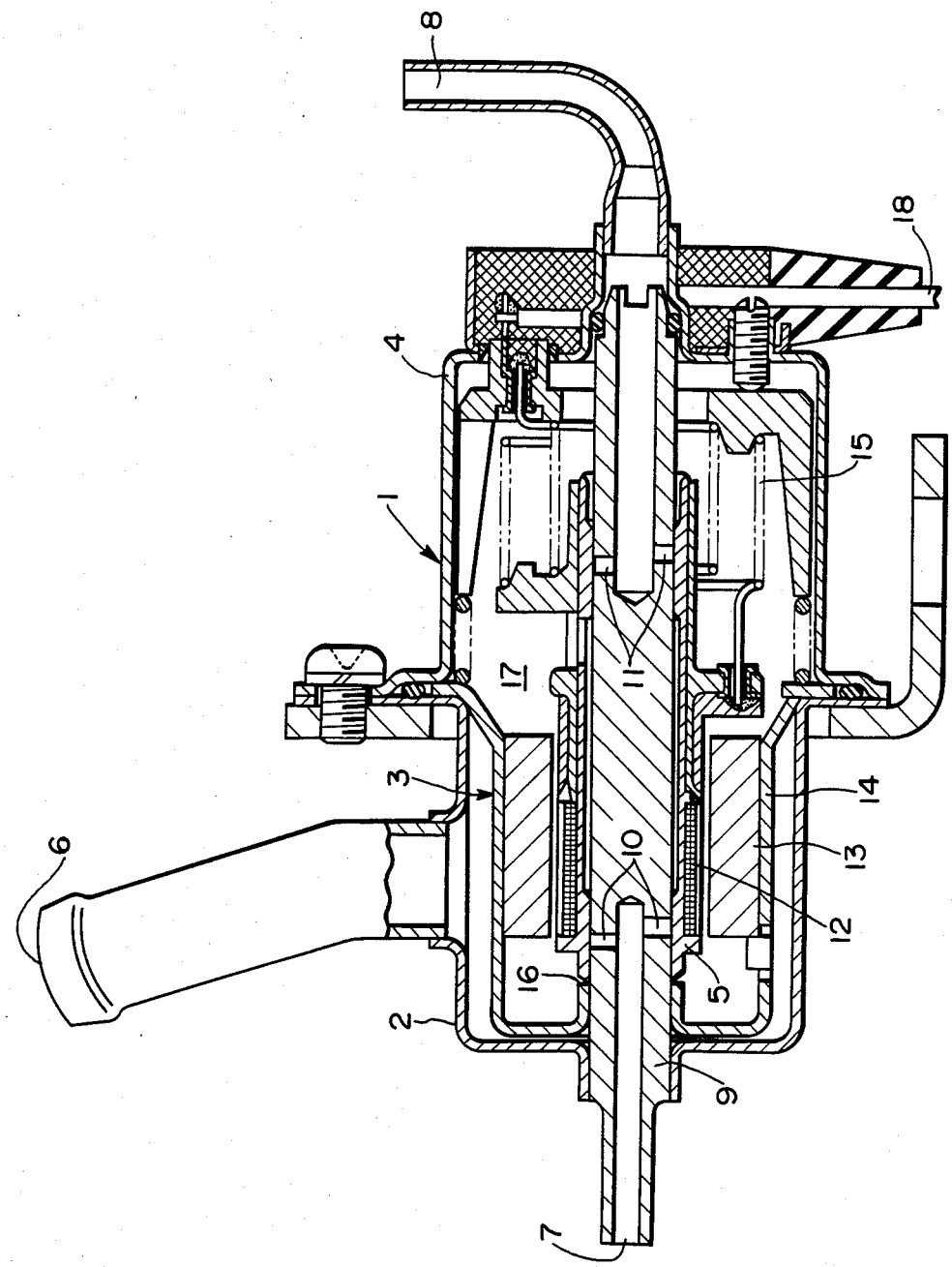

ial cross-sectional view of an electromagnetically operable fluid flow control valve mechanism according to the present invention.

ELECTROMAGNETICALLY OPERABLE FLUID FLOW CONTROL VALVE MECHANISM

This application is a continuation of application Ser. No. 535,065, filed Sept. 23, 1983, now abandoned.

BACKGROUND OF THE INVENTION

The present invention relates to an electromagnetically operable fluid flow control valve mechanism, and more particularly to such a fluid flow control valve mechanism designed especially for use in motor vehicles for preventing an air-fuel mixture from flowing from a carburetor air bleed back into the valve mechanism.

Electromagnetically operable, or solenoid-operated, fluid flow control valve mechanisms include an electromagnetically operable linear motor for opening and closing a slide valve to allow a rate of fluid flow in substantial proportion to a current supplied to the linear motor. Such fluid flow control valve mechanisms find wide use in vehicle emission control devices. In this type of application, the valve mechanism has an inlet port connected to an air cleaner and outlet ports connected to carburetor air bleed ports. A current fed to the valve mechanism is varied dependent on signals responsive to the vacuum, temperature, and rpm of the engine, thus controlling the amount of air flowing into an air bleed to provide an air-fuel ratio making an exhaust gas concentration best suited for a three-way catalyst system.

The outlet ports of the electromagnetically operable fluid flow control valve mechanism are held in communication respectively with slow and main air bleed ports of the carburetor, the valve mechanism having a chamber opening into the inlet port. With this arrangement, the chamber in the valve mechanism is kept under a pressure lower than atmospheric pressure due to a vacuum in the slow air bleed port, with the danger that the air-fuel mixture will flow back into the chamber. One conventional solution has been to provide a check valve in a passage between the outlet ports and the carburetor air bleed port so that a one-way passage will extend from the valve mechanism to the carburetor. However, the one-way check valve requires a large number of parts, and needs additional assembling steps and maintenance effort. Another disadvantage with the one-way check valve is that it takes up additional space for installation, affecting the mounting of other accessories. The foregoing problem with the prior art could be eliminated by enlarging the chamber kept in communication with the inlet port and keeping the chamber under atmospheric pressure or a pressure close thereto at all times. This would render the carburetor air bleed port negative in pressure with respect to the chamber at all times. However, this proposal would increase the size of the casing of the valve mechanism, and would not completely overcome the conventional difficulty.

SUMMARY OF THE INVENTION

It is accordingly an object of the present invention to provide an electromagnetically operable fluid flow control valve mechanism having inlet and outlet ports designed to prevent a valve chamber from developing an increased vacuum therein.

Another object of the present invention is to provide an electromagnetically operable fluid flow control valve mechanism which is relatively small in size, and easy to design and construct.

According to the present invention, an inlet port communicating with a chamber in a casing of an electromagnetic fluid flow control valve mechanism is brought into selective fluid communication with first and second outlet ports in response to energization of an electromagnetic coil on a hollow slide valve. The ratio of a cross-sectional area of the inlet port to that of each of the first and second outlet ports is selected such that the chamber will develop a relatively small vacuum such as of 20 mmAg at maximum. Preferably, the ratio is 6.5 or greater. This arrangement prevents a fluid, typically air, from flowing from the second outlet port back into the chamber.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWING

The sole FIGURE is an axial cross-sectional view of an electromagnetically operable fluid flow control valve mechanism according to the present invention.

DESCRIPTION OF THE PREFERRED EMBODIMENT

As shown, an electromagnetically operable fluid flow control valve mechanism 1 according to the present invention comprises a casing 2 housing a linear motor 3 of the moving coil type therein, and a cover 4 fastened to the casing 2 to close a lateral opening in the casing 2. A slide valve or bobbin 5 is disposed in the linear motor 3 and is axially displaceable in response to energization of the linear motor 3. An inlet port 6 is connected to the casing 2 and also to an air cleaner (not shown). A first outlet port 7 is connected to the casing 2 and also to a slow air bleed of a carburetor (not shown), and a second outlet port 8 is connected to a main air bleed of the carburetor. Axial displacement of the slide valve 5 selectively controls the rate of a fluid flow from the inlet port 6 to the first outlet port 7 or the second outlet port 8.

The linear motor 3 has a hollow iron core 9 held in communication at ends thereof with the first and second outlet ports 7, 8. The hollow iron core 9 has passages 10 capable of providing fluid communication between the inlet port 6 and the first outlet port 7, and passages 11 capable of providing fluid communication between the inlet port 6 and the second outlet port 8. The bobbin 5 is made of nonmagnetic material and is slidably movably mounted on the hollow iron core 9, the bobbin 5 supporting an electromagnetic coil 12 therearound. A pair of permanent magnets 13, 13 are disposed across the electromagnetic coil 12 for generating magnetic fluxes passing perpendicularly through the electromagnetic coil 12. The casing 2 accommodates therein a yoke 14 of magnetic material which cooperates with the iron core 9 in forming a magnetic circuit including the permanent magnets 13. The bobbin 5 slides axially along the outer peripheral surface of the iron core 9 to open and close the passages 10, 11, selectively.

The bobbin 5 is normally urged to move to the left as shown under the resiliency of compression coil springs 15 until a lefthand end of the bobbin 5 abuts against a stop surface 16 of the yoke 14. The electromagnetic coil 12 is electrically connected to a power supply (not shown) through the springs 15 and a cable 18. The casing 2 and the cover 4 jointly define therein a chamber 17 communicating with the inlet port 6.

Operation of the valve mechanism 1 thus constructed is as follows: While the electromagnetic coil 12 remains de-energized, magnetic fluxes from the permanent magnets 13 run in the closed magnetic circuit through the iron core 9 and the magnetic yoke 14, with some magnetic fluxes passing through the magnetic coil 12. When the magnetic coil 12 is energized with a current flowing therethrough, it generates a force directed to the right as shown in proportion to the current through the coil 12. The bobbin 5 is axially displaced rightward against the resilient force from the spring 15 to open the passages 10 for an interval proportional to the current supplied to the coil 12. A fluid, namely air, is now allowed to flow from the inlet port 6 into the first outlet port 7, from which air travels to the slow air bleed port. As the supplied current increases, the bobbin 5 moves rightward further to bring the second outlet port 8 into fluid communication with the inlet port 6, whereupon air is fed from the inlet port 6 through the second outlet port 8 into the main air bleed port.

The inlet port 6 and the outlet ports 7, 8 are of cross-sectional areas such that the chamber 17 will develop a relatively small vacuum therein. Preferably, the ratio of the cross section of the inlet port 6 to that of each outlet port 7, 8 is 6.5 or higher. This ratio is selected so that the vacuum developed in the chamber 17 will not exceed 20 mmAg. The ratio of cross sections thus selected dispenses with any check valve which would otherwise have to be incorporated in the valve mechanism to prevent air from flowing from the second outlet port 8 back into the chamber 17.

Although a certain preferred embodiment has been shown and described, it should be understood that many changes and modifications may be made therein without departing from the scope of the appended claims.

What is claimed is:

1. A control valve mechanism comprising:
a casing assembly defining a chamber therein;
an inlet port in fluid communication with said chamber and with a positive pressure source, said inlet port having a first cross-sectional area;
an electromagnetically actuatable valve assembly disposed in said chamber, said valve assembly including a core having first and second passages therethrough; first and second outlet ports for fluid communication with said chamber through said first and second passages, respectively, each of said first and second outlet ports being in fluid communication with a separate negative pressure source, said first and second outlet ports having second and third cross-sectional areas, respectively; a hollow slide valve slidably mounted on said core for axial linear displacement therealong, said slide valve including at least one aperture to provide selective fluid communication between said chamber and said first and second outlet ports through said first and second passages; an electromagnetic coil for producing a magnetic field across said slide valve; and spring means disposed in said chamber for normally urging said hollow slide valve to close said first and second passages against fluid communication with said chamber, said electromagnetic coil being energizable for axially displacing said hollow slide valve against the resiliency of said spring means and for allowing successive opening of said first and second passages into said chamber, the ratio of said first cross-sectional area to each of said second and third cross-sectional areas being at least 6.5 for limiting the vacuum in said chamber to a maximum value of 20 mmAg to reduce back flow of fluid from said first and second outlet ports to said chamber.

* * * * *